United States Patent [19]

Bialous et al.

[11] 4,197,232

[45] Apr. 8, 1980

[54] FLAME RETARDANT POLYCARBONATE COMPOSITION

[75] Inventors: Charles A. Bialous, Evansville; John B. Luce, Mt. Vernon; Victor Mark, Evansville, all of Ind.

[73] Assignee: General Electric Company, Pittsfield, Mass.

[21] Appl. No.: 949,154

[22] Filed: Oct. 6, 1978

Related U.S. Application Data

[63] Continuation of Ser. No. 496,127, Aug. 9, 1974, abandoned.

[51] Int. Cl.$^2$ .............................................. C08K 7/14
[52] U.S. Cl. ........................ 260/37 PC; 260/45.7 S; 260/DIG. 24
[58] Field of Search ....... 260/37 PC, 45.7 S, DIG. 24

[56] References Cited

U.S. PATENT DOCUMENTS

| | | | |
|---|---|---|---|
| 3,845,007 | 10/1974 | Nowvertne et al. | 260/37 PC |
| 3,909,490 | 9/1975 | Mark | 260/45.7 S |
| 3,917,559 | 11/1975 | Mark | 260/45.7 S |
| 3,933,734 | 1/1976 | Mark et al. | 260/45.7 S |
| 3,940,366 | 2/1976 | Mark | 260/45.7 S |

Primary Examiner—Sandra M. Person
Attorney, Agent, or Firm—Salvatore C. Mitri; William F. Mufatti

[57] ABSTRACT

An improved flame retardant polycarbonate composition of an aromatic carbonate polymer in admixture with an organic alkali metal salt or an organic alkaline earth metal salt or mixture thereof, which composition has in admixture therewith fibrous glass.

4 Claims, No Drawings

FLAME RETARDANT POLYCARBONATE COMPOSITION

This is a continuation, of application Ser. No. 496,127, filed Aug. 9, 1974, now abandoned.

This invention is directed to an improved flame retardant polycarbonate composition of an aromatic carbonate polymer in admixture with an organic alkali metal salt or an organic alkaline earth metal salt or mixture thereof, the improvement which comprises having in admixture with the polycarbonate fibrous glass in sufficient quantity to render the polycarbonate composition non-dripping.

BACKGROUND OF THE INVENTION

In the art, there are many flame retardant additives which are employed by mixing with polycarbonate to render such materials self-extinguishing or flame retardant. Such flame retardant additives are employed in varying amounts in order to be effective in extinguishing burning of those products which are combustible.

However, even if the polycarbonate does not burn, in flame, it may drip hot particles which can ignite material below it.

DESCRIPTION OF THE INVENTION

It has been suprisingly discovered that an aromatic polycarbonate made flame retardant by incorporating with the aromatic polycarbonate organic alkali metal salts or organic alkaline earth metal salts or mixtures thereof can be rendered nondripping by admixing the flame retardant polycarbonate with fibrous glass.

By glass fibers, it is understood that glass silk, as well as all glass fiber materials derived therefrom including glass fiber fabrics, rovings, stable fibers and glass fiber mats are included. The length of the glass filaments and whether or not they are bundled into fibers and the fibers bundled in turn to yarns, ropes or rovings, or woven into mats, and the like, are also not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths of from about $\frac{1}{8}$" to about 1" long, preferably less than $\frac{1}{4}$" in length. These are called chopped strands. Some of these binding agents are polymers such as polyvinyl acetate, particular polyester resins, polycarbonates, starch, acrylic melamine, polyvinyl chloride, polyethylene oxide or polyvinyl alcohol. Preferably, the composition contains from about 1 to about 50 weight percent of the glass fibers.

The composition of the instant invention may also include the fluorinated polyolefin as described in copending application of Charles A. Bialous, John B. Luce and Victor Mark, Ser. No. 496,128 filed concurrently herewith and now abandoned for continuation application Ser. No. 949,964 filed Oct. 10, 1978, both of said applications assigned to the same assignee as the present invention. Also, the composition of the instant invention may include the siloxanes described in copending application of Charles A. Bialous, John B. Luce and Victor Mark, Ser. No. 496,115 filed Aug. 9, 1974 (now U.S. Pat. No. 3,971,756) filed concurrently herewith and assigned to the same assignee, as the present invention. Applications Ser. No. 496,128 and Ser. No. 496,115 are incorporated herein by reference. Further, the instant composition can include both fluorinated polyolefin and siloxanes.

The organic alkali metal and alkaline metal salts employed herein are fully described in the following applications:

Application (A) of Victor Mark and Thomas J. Hoogeboom, Ser. No. 429,643 filed Dec. 28, 1973 titled A Flame Retardant Polycarbonate Composition, now U.S. Pat. No. 3,933,734.

This application discloses a flame retardant polycarbonate composition comprising in admixture an aromatic carbonate polymer and a flame retardant additive which may be the metal salts of either monomeric or polymeric aromatic sulfonic acids, or mixtures thereof.

Application (B) of Victor Mark, Ser. No. 429,121 filed Dec. 28, 1973 titled A Flame Retardant Polycarbonate Composition and assigned to the same assignee as the present invention and now U.S. Pat. No. 3,948,851. This application discloses a flame retardant polycarbonate composition comprising in admixture an aromatic carbonate polymer and a flame retardant additive which may be the metal salts of either monomeric or polymeric aromatic sulfonesulfonic acids, or mixtures thereof.

Application (C) of Victor Mark, Ser. No. 429,642 filed Dec. 28, 1973 titled A Flame Retardant Polycarbonate Composition and assigned to the same assignee as the present invention and now U.S. Pat. No. 3,926,908. This application discloses a flame retardant polycarbonate composition comprising in admixture an aromatic carbonate polymer and a flame retardant additive which may be the metal salts of sulfonic acids of aromatic ketones, or mixtures thereof.

Application (D) of Victor Mark, Ser. No. 429,166 filed Dec. 28, 1973 titled A Flame Retardant Polycarbonate Composition and assigned to the assignee as the present invention and now U.S. Pat. No. 3,919,167. This application discloses a flame retardant polycarbonate composition comprising in admixture an aromatic carbonate polymer and a flame retardant additive which may be the metal salts of heterocyclic sulfonic acids, or mixtures thereof.

Application (E) of Victor Mark, Ser. No. 429,125 filed Dec. 28, 1973 titled A Flame Retardant Polycarbonate Composition and assigned to the same assignee as the present invention and now abandoned. This application discloses a flame retardant polycarbonate composition comprising in admixture an aromatic carbonate polymer and a flame retardant additive which may be the alkali metal salts of halogenated methanesulfonic acids or mixtures thereof, or mixtures of the alkali metal salts and the alkali earth metal salts.

Application (F) of Victor Mark, Ser. No. 429,644 filed Dec. 28, 1973 titled A Flame Retardant Polycarbonate Composition and assigned to the same assignee as the present invention and now U.S. Pat. No. 4,066,618. This application discloses a flame retardant polycarbonate composition comprising in admixture an aromatic carbonate polymer and a flame retardant additive which may be metal salts of a halogenated non-aromatic carboxylic acid or mixtures thereof.

Application (G) of Victor Mark, Ser. No. 429,163 filed Dec. 28, 1973 titled A Flame Retardant Polycarbonate Composition and assigned to the same assignee as the present invention and now U.S. Pat. No. 3,909,490. This application discloses a flame retardant polycarbonate composition comprising in admixture an aromatic carbonate polymer and a flame retardant additive which may be the metal salts of sulfonic acids of aromatic sulfides, or mixtures thereof.

Application (H) of Victor Mark, Ser. No. 429,128 filed Dec. 28, 1973 titled A Flame Retardant Polycarbonate Composition and assigned to the same assignee as the present invention and now U.S. Pat. No. 3,953,396. This application discloses a flame retardant polycarbonate composition comprising in admixture an aromatic carbonate polymer and a flame retardant additive which may be the metal salts of either monomeric or polymeric aromatic ether sulfonic acids, or mixtures thereof.

Application (I) of Victor Mark, Ser. No. 429,645 filed Dec. 28, 1973 titled A Flame Retardant Polycarbonate Composition and assigned to the same assignee as the present invention and now U.S. Pat. No. 3,931,100. This application discloses a flame retardant polycarbonate composition comprising in admixture an aromatic carbonate polymer and a flame retardant additive which may be the metal salts of aliphatic and olefinic sulfonic acids, and mixtures thereof.

Application (J) of Victor Mark, Ser. No. 429,126 filed Dec. 28, 1973 titled A Flame Retardant Polycarbonate Composition and assigned to the same assignee as the present invention and now U.S. Pat. No. 3,978,024. This application discloses a flame retardant polycarbonate composition comprising in admixture an aromatic carbonate polymer and a flame retardant additive which may be the metal salts of either monomeric or polymeric phenol ester sulfonic acids, or mixtures thereof.

Application (K) of Victor Mark, Ser. No. 429,164 filed Dec. 28, 1973 titled A Flame Retardant Polycarbonate Composition and assigned to the same assignee as the present invention and now U.S. Pat. No. 4,069,201. This application discloses a flame retardant polycarbonate composition comprising in admixture an aromatic carbonate polymer and a flame retardant additive which may be the metal salts of unsubstituted or halogenated oxocarbon acids, or mixtures of these.

Application (L) of Victor Mark, Ser. No. 429,127 filed Dec. 28, 1973 titled A Flame Retardant Polycarbonate Composition and assigned to the same assignee as the present invention and now U.S. Pat. No. 3,953,399. This application discloses a flame retardant polycarbonate composition comprising in admixture an aromatic carbonate polymer and a flame retardant additive which may be the metal salts of sulfonic acids of monomeric and polymeric aromatic carboxylic acids and esters, and mixtuures thereof.

Application (M) of Victor Mark, Ser. No. 429,165 filed Dec. 28, 1973 titled A Flame Retardant Polycarbonate Composition and assigned to the same assignee as the present invention and now U.S. Pat. No. 3,917,559. This application discloses a flame retardant polycarbonate composition comprising in admixture an aromatic carbonate polymer and a flame retardant additive which may be the metal salts of halocycloaliphatic aromatic sulfonic acids.

Application (N) of Victor Mark, Ser. No. 429,646 filed Dec. 28, 1973 titled A Flame Retardant Polycarbonate Composition and assigned to the same assignee as the present invention and now U.S. Pat. No. 3,951,910. This application discloses a flame retardant polycarbonate composition comprising in admixture an aromatic carbonate polymer and a flame retardant additive which may be the metal salts of either monomeric or polymeric aromatic amide sulfonic acids, or mixtures thereof.

Application (O) of Victor Mark, Ser. No. 429,120 filed Dec. 28, 1973 titled A Flame Retardant Polycarbonate Composition and assigned to the same assignee as the present invention and now U.S. Pat. No. 3,940,366. This application discloses a flame retardant polycarbonate composition comprising in admixture an aromatic carbonate polymer and a flame retardant additive which may be the metal salts of either monomeric or polymeric aromatic sulfonic acids, or mixtures thereof.

Applications A through O are incorporated herein by reference. The metal salts of any of these applications as well as mixtures of any of the metal salts of any of the applications may be used.

Preferred salts include sodium 2,4,5-trichlorobenzene sulfonate; sodium benzene sulfonate; disodium naphthalene-2,6-disulfonate; sodium p-iodobenzenesulfonate; sodium 4,4'-dibromobiphenyl-3-sulfonate; sodium 2,3,4,5,6-pentachloro-betastyrenesulfonate; sodium 4,4'-dichlorodiphenylsulfide-3-sulfonate; disodium tetrachlorodiphenyletherdisulfonate; disodium 4,4'-dichlorobenzophenone-3,3'-disulfonate; sodium 2,5-dichlorothiophene-3-sulfonate; sodium salt of diphenylsulfone-3-sulfonic acid; sodium dimethyl 2,4,6-trichloro-5-sulfoisophthalate; potassium salt of the sulfonic acid of dichlorophenyl 2,4,5-trichlorobenzene sulfonate; calcium salt of 2,4,5-trichlorobenzenesulfonanilide-4'-sulfonate; sodium 4'[1,4,5,6,7,7-hexachlorobicyclo-[2.2.1]-hept-5-en-endo-2-yl] benzenesulfonate; disodium hexafluoroglutarate; disodium chloranilate; and mixtures thereof. These salts are used in amount of from 0.01 to about 10 weight percent based on the weight of the aromatic carbonate polymer composition.

The aromatic carbonate polymers employed in the practice of this invention are homopolymers and copolymers that are prepared by reacting the dihydric phenol with a carbonate precursor. The dihydric phenols that can be employed are bisphenols such as bis(4-hydroxyphenyl) methane, 2,2-bis(4-hydroxyphenyl) propane (hereinafter referred to as bisphenol-A), 2,2-bis(4-hydroxy-3-methylphenyl) propane, 4,4-bis(4-hydroxyphenyl) heptane, 2-2-bis(4-hydroxy-3,5-dichlorophenyl) propane, 2,2-bis(4-hydroxy-3,5-dibromophenyl) propane, etc., dihydric phenol ethers such as bis(4-hydroxyphenyl) ether, bis (3,5-dichloro-4-hydroxyphenyl) ether, etc.; dihydroxydiphenyls such as p,p'-dihydroxydiphenyl, 3,3'-dichloro-4,4'-dihydroxydiphenyl, etc.; dihydroxyaryl sulfones such as bis(4-hydroxyphenyl) sulfone, bis(3,5-dimethyl-4-hydroxyphenyl) sulfone, etc., dihydroxy benzene, resorcinol, hydroquinone, halo- and alkyl-substituted dihydroxy benzenes such as 1,4-dihydroxy-2,5-dichlorobenzene, 1,4-dihydroxy-3-methylbenzene, etc., and dihydroxy diphenyl sulfoxides such as bis(4-hydroxyphenyl) sulfoxide, bis-(3,5-dibromo-4-hydroxyphenyl) sulfoxide, etc. A variety cf additional dihydric phenols are also available to provide carbonate polymers and are disclosed in U.S. Pat. Nos. 2,999,835; 8,028,365 and 3,153,008. Also suitable for preparing the aromatic carbonate polymers are copolymers prepared from any of the above copolymerized with halogen-containing dihydric phenols such as 2,2-bis(3,5-dichloro-4-hydroxyphenyl) propane, 2,2-bis(3,5-dibromo-4-hydroxyphenyl) propane, etc. It is of course possible to employ two or more different dihydric phenols or a copolymer of a dihydric phenol with glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halo-phenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride also known as phosgene is preferred.

Also included are the polymeric materials of a dihydric phenol, a dicarboxylic acid and carbonic acid. These are disclosed in U.S. Pat. No. 3,169,121 which is incorporated herein by reference.

The aromatic carbonate polymers of this invention are prepared by employing a molecular weight regulator, an acid acceptor and a catalyst. The molecular weight regulators which may be employed in carrying out the process of this invention include phenol, cyclohexanol, methanol, para-tertiarybutylphenol, para-bromophenol, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkali earth metal.

Obviously other materials can also be employed with the aromatic carbonate polymer of this invention and include such materials as anti-static agents, pigments, mold release agents, thermal stabilizers, ultraviolet light stabilizers, reinforcing fillers and the like.

The composition of this invention is prepared by admixing the aromatic carbonate polymer with the organic alkali metal or alkaline earth metal salts and the fibrous glass.

DESCRIPTION OF THE PREFERRED EMBODIMENT

The following examples are set forth to illustrate more clearly the principle and practice of this invention to those skilled in the art. Unless otherwise specified, where parts or percents are mentioned, they are parts or percents by weight.

EXAMPLE I

A polycarbonate composition is prepared by extruding a homopolymer of 2,2-bis(4-hydroxyphenyl) propane (hereinafter referred to as bisphenol-A) prepared by reacting essentially equimolar amounts of bisphenol-A and phosgene in an organic medium with triethylamine; sodium hydroxide, and phenol, under standard conditions. The resulting polymer is then fed to an extruder, which extruder is operated at about 265° C., and the extrudate is comminuted into pellets.

The pellets are then injection molded at about 315° C. into test bars of about 5 in. by $\frac{1}{2}$ in. by about 1/16–$\frac{1}{8}$ in. thick. The test bars (5 for each additive listed in the Table) are subject to the test procedure set forth in Underwriter' Laboratories, Inc. Bulletin 94, Burning Test for Classifying Materials (hereinafter referred to as UL-94). In accordance with this test procedure, materials so investigated are rated either UL-94 V-O, UL-94 V-I, UL-94 V-II, based on the results of 5 specimens. The criteria for each UL-94 V rating per UL-94 is briefly as follows:

"UL-94 V-O":
  Average flaming and/or glowing after removal of the igniting flame shall not exceed 5 seconds and none of the specimens shall drip particles which ignite absorbent cotton.

"UL-94 V-I":
  Average flaming and/or glowing after removal of the igniting flame shall not exceed 25 seconds and none of the specimens shall drip particles which ignite absorbent cotton.

"UL-94 V-II":
  Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burning." Further, UL-94 requires that all test bars must meet the UL-94 V type rating to achieve the particular rating. Otherwise, the 5 bars receive the rating of the worst single bar. For example, if one bar is classified as UL-94 V-II and the other four (4) are classified as UL-94 V-O, then the rating for all 5 bars is UL-94 V-II.

The results are shown in the Table.

EXAMPLE II

To the polycarbonate of Example I is added 0.5 parts of sodium 2,4,5-trichlorobenzenesulfonate. The mixture is extruded, molded, and tested in the same manner as described in Example I.

EXAMPLE III

To the polycarbonate of Example I is added 0.5 parts of sodium 2,4,5-trichlorobenzenesulfonate and 6.0 parts of fibrous glass. The mixture is extruded, molded and tested in the same manner as described in Example I.

The remaining compositions are prepared by the methods of Examples I to III.

| EXAMPLE | SALT ADDITIVE | PARTS | GLASS PARTS | FLAME OUT TIME Sec. (Avg) | NO. OF DRIP PER 5 BARS | RATING |
|---|---|---|---|---|---|---|
| I | — | — | — | 13.4 | 10 | Burning |
| II | Sodium 2,4,5-trichlorobenzene sulfonate | 0.5 | — | 3.4 | 8 | UL-94 VII |
| III | Sodium 2,4,5-trichlorobenzene sulfonate | 0.5 | 6.0 | 4.8 | 0 | UL-94 V-O |
| IV | Sodium benzenesulfonate | 1.0 | 8.0 | 5.0 | 0 | UL-94 V-O |
| V | Disodium napthalene-2,6-disulfonate | 1.0 | 6.0 | 4.6 | 0 | UL-94 V-O |
| VI | Disodium tetrachlorodiphenyletherdisulfonate | 0.5 | — | 4.4 | 2 | UL-94 V-II |
| VII | Disodium tetrachlorodiphenyletherdisulfonate | 0.5 | 8.0 | 4.7 | 0 | UL-94 V-O |
| VIII | Sodium 2,3,4,5,6-pentachloro-betastyrenesulfonate | 0.5 | 4.0 | 3.6 | 0 | UL-94 V-O |
| IX | Sodium 4,4'-dichlorodiphenylsulfide-3-sulfonate | 0.5 | 10.0 | 4.6 | 0 | UL-94 V-O |
| X | Disodium 4,4'-dichlorobenzophenone-3,3'-disulfonate | 0.5 | 6.0 | 4.6 | 0 | UL-94 V-O |
| XI | Sodium 2,5-dichlorothiophene-3-sulfonate | 0.3 | 8.0 | 3.2 | 0 | UL-94 V-O |
| XII | Sodium diphenylsulfone-3-sulfonate | 0.4 | 8.0 | 3.3 | 0 | UL-94 V-O |
| XIII | Sodium dimethyl 2,4,6-trichloro-5-sulfoisophthalate | 1.0 | 6.0 | 4.0 | 0 | UL-94 V-O |
| XIV | Potassium salt of the sulfonic acid of dichlorophenyl 2,4,5-trichlorobenzenesulfonate | 0.3 | 6.0 | 5.0 | 0 | UL-94 V-O |
| XV | Calcium 2,4,5-trichlorobenzenesulfonanilide-4'-sulfonate | 1.0 | 7.0 | 4.9 | 0 | UL-94 V-O |
| XVI | Sodium 4'[1,4,5,6,7,7-hexachlorobicyclo-[2.2.1]-hept-5-en-endo-2-yl]benzenesulfonate | 1.0 | 3.0 | 3.8 | 0 | Ul-94 V-O |
| XVII | Disodium hexafluoroglutarate | 1.0 | 2.0 | 5.6 | 0 | UL-94 V-I |
| XVIII | Disodium chloranilate | 0.2 | 6.0 | 4.3 | 0 | UL-94 V-O |

As can be seen from the data in the Table, when the polycarbonate compositions contain the fibrous glass in addition to the flame retardant additives, the polycarbonate does not drip and is rated either UL-94 V-O, or UL-94 V-I.

Other flame retardant additives can be substituted for those of the Table with similar results.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. An improved halogen-free flame-retardant polycarbonate composition, said composition comprising an aromatic polycarbonate in admixture with about 0.01 to about 10.0 weight percent based on the weight of said polycarbonate of an organic alkali metal salt or an organic alkaline earth metal salt, said salts being derived from acids selected from the group consisting of
  unsubstituted monomeric or polymeric aromatic sulfonic acids,
  monomeric or polymeric aromatic sulfonesulfonic acids,
  sulfonic acids of aromatic ketones,
  heterocyclic sulfonic acids,
  sulfonic acids of aromatic sulfides,
  monomeric or polymeric aromatic ether sulfonic acids,
  olefinic sulfonic acids,
  monomeric or polymeric phenol ester sulfonic acids,
  unsubstituted or halogenated oxocarbon acids,
  sulfonic acids of monomeric and polymeric aromatic carboxylic acids and esters,
  halocycloaliphatic aromatic sulfonic acids,
  monomeric or polymeric aromatic amide sulfonic acids,
  monomeric or polymeric aromatic sulfonic acids,
or mixtures thereof, said improvement comprising including in admixture in said polycarbonate composition a fibrous glass in an amount of about 1.0 to about 50.0 weight percent based upon the total weight of said polycarbonate composition such that said polycarbonate composition is rendered non-dripping in addition to being flame retardant.

2. The composition of claim 1 wherein said fibrous glass is present in an amount of about 2 to about 10 weight percent.

3. The composition of claim 1 wherein the organic alkali metal salt is sodium 2,4,5-trichlorobenzenesulfonate.

4. The composition of claim 1 wherein the organic alkali metal salt is sodium benzenesulfonate.

* * * * *